United States Patent [19]

D'Haen

[11] Patent Number: 5,079,792
[45] Date of Patent: Jan. 14, 1992

[54] ABSORBENT ELEMENT FOR NON-AQUEOUS LIQUIDS

[75] Inventor: Eduard J. D'Haen, Boechout, Belgium

[73] Assignee: Engicom, naamloze vennootschap, Brussel, Belgium

[21] Appl. No.: 378,918

[22] Filed: Jul. 12, 1989

[30] Foreign Application Priority Data

Jul. 15, 1988 [BE] Belgium .............................. 8800830
Dec. 28, 1988 [BE] Belgium .............................. 8801443

[51] Int. Cl.⁵ .................. A47L 13/18; B32B 3/16; B32B 3/22; B32B 5/24; B32B 5/30
[52] U.S. Cl. .................................. 15/227; 2/16; 2/158; 428/74; 428/76; 428/78; 428/137; 428/138; 428/283; 428/286; 428/311.1; 428/311.5; 428/316.6; 428/317.9; 428/319.7; 428/319.9; 428/408
[58] Field of Search ............... 428/286, 281, 282, 408, 428/283, 74, 76, 78, 311.1, 311.5, 316.6, 317.9, 319.7, 319.9; 2/16, 158

[56] References Cited

U.S. PATENT DOCUMENTS

| 4,217,386 | 8/1980 | Arons et al. | 428/198 |
| 4,433,024 | 2/1984 | Eian | 428/198 |
| 4,460,641 | 7/1984 | Rarer et al. | 428/246 |
| 4,565,727 | 1/1986 | Giglia et al. | 428/172 |
| 4,681,801 | 7/1987 | Eian et al. | 428/283 |
| 4,737,394 | 4/1988 | Zafiroglu | 428/283 |
| 4,738,894 | 4/1988 | Borde | 428/283 |
| 4,755,178 | 7/1988 | Insley et al. | 428/283 |
| 4,781,962 | 11/1988 | Zommarripa et al. | 428/282 |
| 4,849,279 | 7/1989 | Toyama et al. | 428/408 |
| 4,886,697 | 12/1989 | Perdelwitz et al. | 428/282 |
| 4,902,559 | 2/1990 | Eschwey et al. | 428/283 |
| 4,913,954 | 4/1990 | Mock | 428/284 |

FOREIGN PATENT DOCUMENTS

0903622 3/1986 Belgium .

Primary Examiner—James C. Cannon
Attorney, Agent, or Firm—Foley & Lardner

[57] ABSTRACT

Absorbent element, characterized in that it principally consists of at least two layers (1, 2, 6) of which one layer (1), which is destined to be brought into direct contact with the product to be absorbed, primarily consists of a strongly liquid absorbing hydrophobic material.

16 Claims, 2 Drawing Sheets

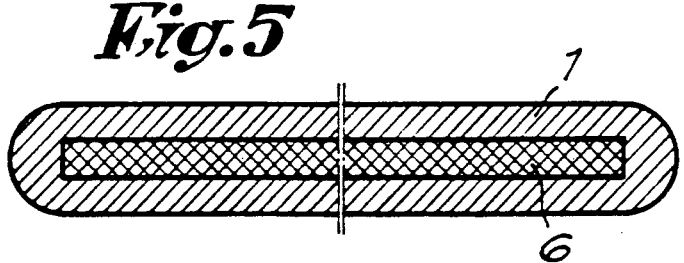
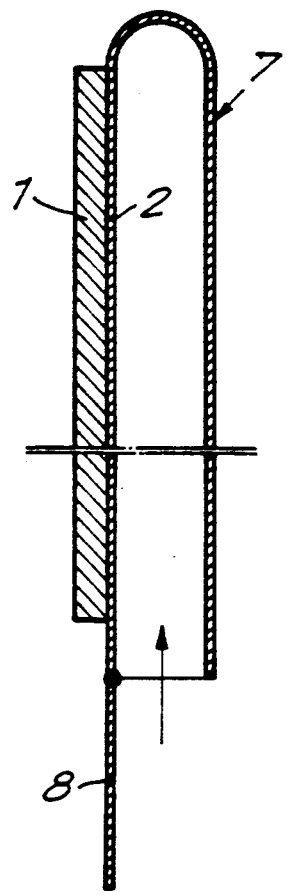
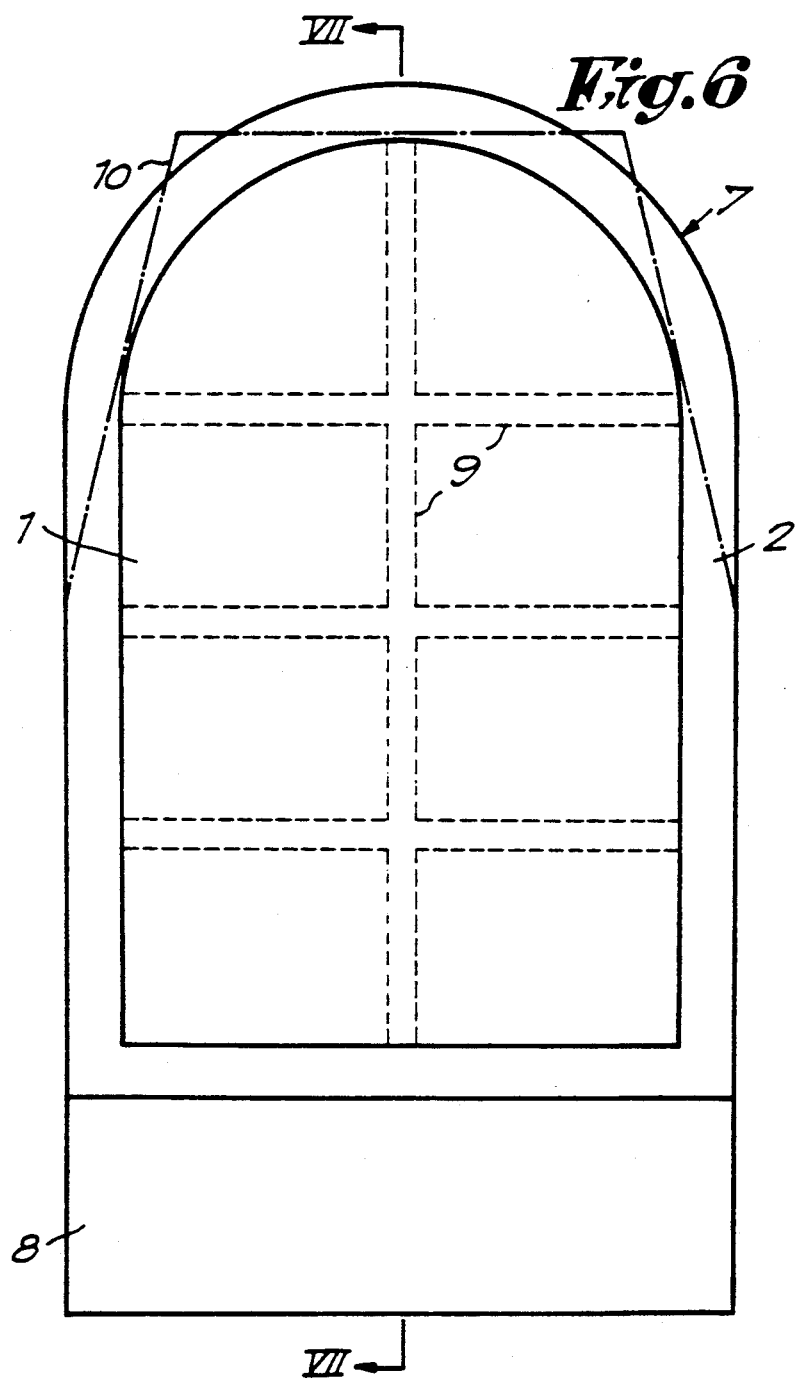
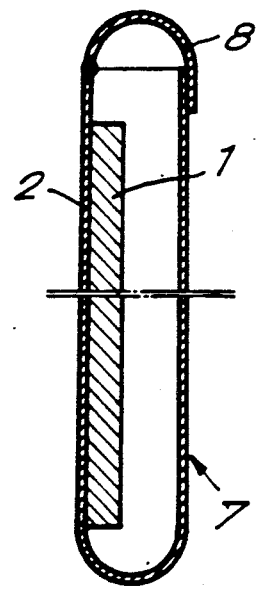

ABSORBENT ELEMENT FOR NON-AQUEOUS LIQUIDS

BACKGROUND OF THE INVENTION

1. Field of the Invention

This invention relates to an absorbent element for the absorption of dangerous, polluting and/or contaminating products, in particular liquids, which have fallen on persons or objects.

The invention mainly concerns polluting and toxic chemicals which must be removed as quickly and as thoroughly as possible. Especially with contamination of persons by highly toxic chemical substances it is of great importance to provide quick decontamination.

2. Brief Description of Related Art

According to one of the present known techniques, decontamination of persons or objects is effected by sprinkling the contaminated places with liquid absorbing powdery fuller's earth. Notwithstanding the disadvantage that fuller's earth combines with the dangerous substance, this technique also releases the toxic substance again if it comes into contact with an excess of water. A second disadvantage is that powdery fuller's earth, as well as other absorbent powders, can penetrate into the smallest openings of apparatus, and, for example electronic apparatus may also possibly be disrupted under the influence of the toxic product absorbed by the powder.

A third disadvantage is that the contaminated powder can only be gathered up with great difficulty. Therefore, such that the contaminated product, notwithstanding that it is in compound form, still always remains present. A fourth disadvantage is that in a later decontamination with water, the toxic product is again released and can spread in the vicinity.

According to another known technique, active charcoal in granular and powder form is applied. Notwithstanding active charcoal is less hydrophilic, it shows the same disadvantages as fuller's earth.

According to yet another known method, use is made of an absorbent element consisting of active charcoal in felt or in a holder. Such absorbent element has however the disadvantage that the absorption occurs very slowly and a quick decontamination is completely excluded. Active charcoal in felt or in a holder is also mostly used for clothing, whereby the purpose is that the liquid does not penetrate. Furthermore, such an absorbent element has disadvantage that the charcoal in powder form can come loose from the felt, with all the adverse consequences of this.

The Belgian patent no. 903.622 of the applicant discloses an absorbent element that provides the combination of two layers, namely an upper layer of active charcoal and a layer of hydrophilic material installed underneath it. This combination offers the advantage that larger amounts of liquid can be treated because the water does not then remain behind in the active charcoal, but is removed from the layer of active charcoal by the hydrophilic layer. The absorption capacity for toxic substances is therefore greater through the presence of a second hydrophilic layer, but the limited speed with which the liquids are absorbed by the active charcoal, remains a disadvantage.

The U.S. Pat. No. 4,217,386 discloses a protective fabric for pieces of clothing that absorbs and neutralizes poisonous vapors before they can reach the skin of the wearer, that allows air to penetrate this fabric and that prevents sweat in a liquid state from coming into contact with the active charcoal so that no poisoning of the active charcoal can occur. This known fabric is extremely suitable as a protection against dangerous vapors, but does not allow polluting liquids to be absorbed in great measure. The utilization of this fabric then also remains limited to a shielding function, in particular, with pieces of clothing.

SUMMARY AND OBJECTS OF THE PRESENT INVENTION

The present invention has as object an absorbent element that does not have the aforementioned disadvantages and meets all the necessary requirements, in other words, an absorbent element that allows simple, manual, quick and thorough decontaminating whereby the absorbed toxic liquids do not get spread around again, even in the presence of water, and whereby it prevents the absorbent substance from causing a hindrance, for example, by penetrating sensitive apparatus.

The invention, for this purpose, is an absorbent element which comprises a combination of at least two layers, of which one layer, which is destined to be brought into direct contact with the product to be absorbed, primarily consists of a strongly liquid absorbing hydrophobic material. The use of similar absorbent hydrophobic material offers the advantage that the absorbent element can only absorb a limited amount of water, but a notable amount of toxic liquid.

The second layer can either consist of a protective layer, or of a second absorbent layer on the basis of active charcoal, such that the toxic substances remain immobilized.

In the first case, the second layer must provide that the toxic products remain absorbed in the hydrophobic outer layer. The impermeability of the protective layer to liquids and gases impedes the contact of the toxic agents with other materials.

In the second case, through the combination of the liquid absorbing hydrophobic material with a material on the basis of active charcoal, the advantage is offered that the strongly absorbent hydrophobic material functions as a selective filter such that almost exclusively the toxic substances, and not the possible water, present reach the charcoal layer. The toxic substances can then be more strongly absorbed by the active charcoal.

In a particular embodiment the absorbent element consists successively of a layer of liquid absorbing hydrophobic material, a layer on the basis of active charcoal and a protective layer.

Preferably, polypropylene fiber is applied for the strongly liquid absorbing hydrophobic material.

DESCRIPTION OF THE FIGURES

In order to show better the characteristics according to the present invention, some preferred embodiments are described hereafter, as examples and without any restrictive character with reference to the enclosed drawings, in which:

FIGS. 2 through 5 show different variants of the invention;

FIG. 6 shows an absorbent element according to the invention in the form of a mitten;

FIG. 7 shows a cross-section according to line VII—VII in FIG. 6;

FIG. 8 shows the element according to FIG. 7 after use;

DETAILED DESCRIPTION OF THE PREFERRED EMBODIMENTS

Figure 1:
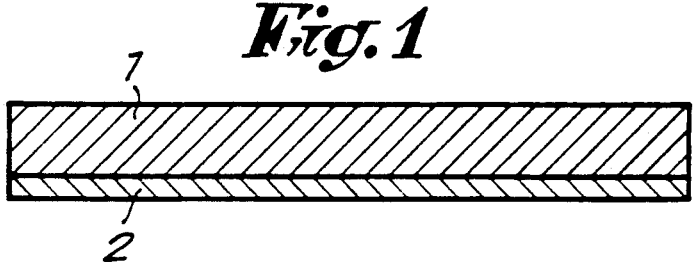
FIG. 1 shows in cross-section an absorbent element according to the invention.

As shown in FIG. 1, the absorbent element according to the invention comprises a combination of at least two layers, of which the layer 1, which is destined to be brought into direct contact with the product to be absorbed, primarily consists of a strongly liquid absorbing hydrophobic material. For this layer 1, material on the basis of polyolefines is preferably applied. Very good results are achieved by means of non-woven polyolefines coded materials. Polypropylene fiber is preferably applied for this purpose. It is hereby noted that non-woven polypropylene fiber absorbs nine times its own weight in polluting liquid, while it can only absorb half of its own weight in water.

Figure 2:
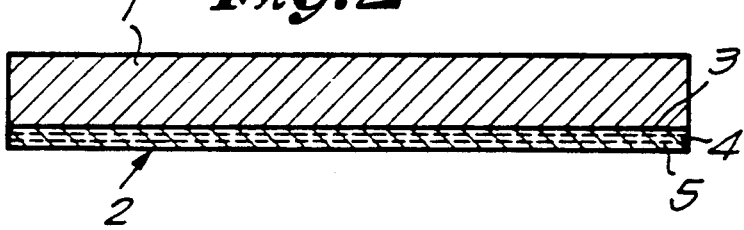

As shown in FIGS. 1 and 2, the second layer preferably consists of a protective layer and/or support layer 2, of an impermeable, gastight and chemically inert material, composed of a certain polymer or of different polymers.

The liquid absorbing hydrophobic layer 1 is preferably used in combination with a protective layer 2 which is formed by barrier material, more especially butyl rubber or a plastic foil which is composed of one or more layers.

In the preferred embodiment a barrier foil, as shown schematically in FIG. 2, consists of three films 3, 4 and 5. The middle film 4 provides the barrier properties of the foil and consists, for example, of polyvinylidene-chloride.

The protective layer 2 prevents the product absorbed in the layer 1 from penetrating to the back of the absorbent element.

Figure 3:
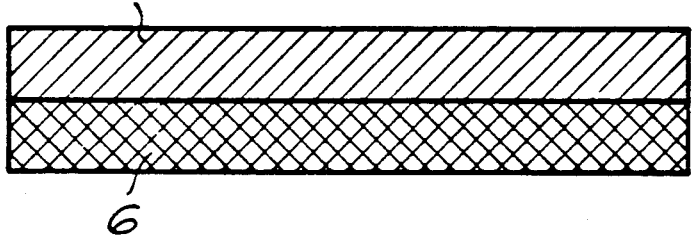
Figure 4:
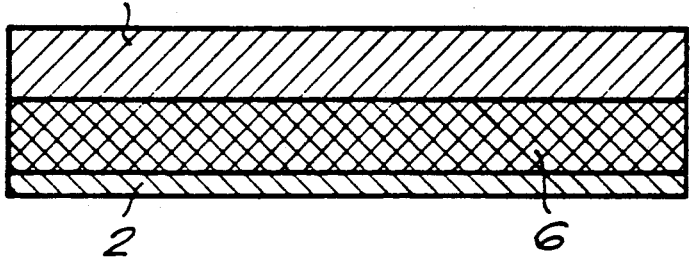

As shown in FIG. 3, a layer 6 on the basis of active charcoal can also be applied in the place of the protective layer 2. It consists, for example, of a pure charcoal layer, either carbon granules which are held together by means of a porous pellicle, such as a polyester pellicle, or activated carbon felt. As shown in FIG. 4, the whole element of FIG. 3 can in its turn be installed on a protective layer 2 as discussed before.

It is clear that the combination of the layer 1 of liquid absorbing hydrophobic material and the layer 6 on the basis of active charcoal offers the advantage that the strongly liquid absorbing hydrophobic material functions as a selective filter, such that almost exclusively the toxic substances and not the possible water present reach the charcoal layer. The liquids can be strongly absorbed in the charcoal layer, which is not the case in the liquid absorbing hydrophobic material.

The absorbent element according to the invention can be produced in different forms. FIG. 5 shows an absorbent element according to the invention that originating from the basic form according to FIG. 3, now is produced with double walls, such that the aforementioned layer 1 consisting of the liquid absorbing hydrophobic material extends along both sides of the layer 6, consisting of the active charcoal. The absorbent element in that case forms an absorbent cloth.

Figure 9:
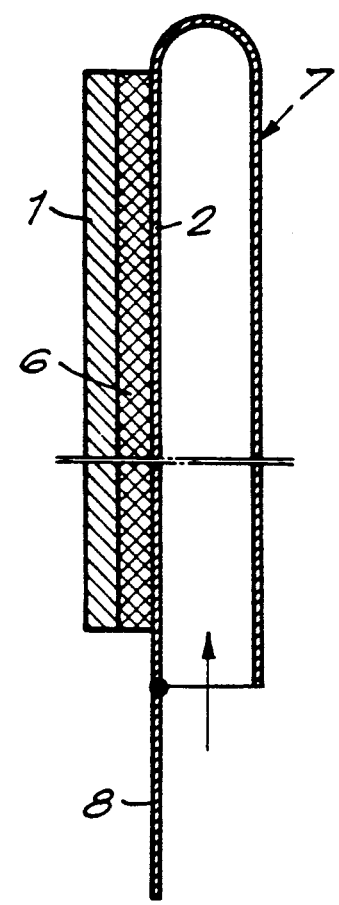
FIGS. 9 and 10 show a variant of the invention for similar views as FIGS. 7 and 8.
Figure 10:
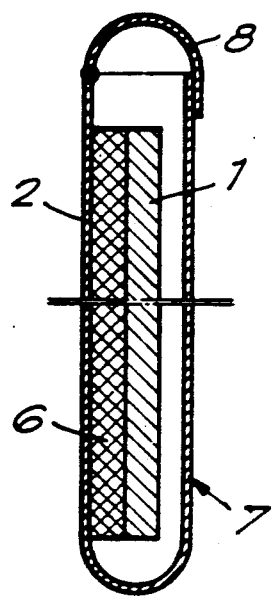

According to FIGS. 6 through 10 the absorbent element is produced in the form of a mitten. FIGS. 7 and 8 show such an embodiment wherein a layer structure is utilized corresponding to those from FIGS. 1 or 2, while FIGS. 9 and 10 show the embodiment wherein a layer structure is utilized corresponding to FIG. 4. The protective layer or support layer 2 is for this purpose part of an impermeable envelope 7 with a sealing flap 8. The layer 1, or respectively the layers 1 and 6, are on the outside. After use, the mitten is turned inside out so that this acquires the function of a storage back in plastic foil, that can be closed by means of the sealing flap 8. In this way, a safe treatment of the used element is guaranteed in all circumstances.

In order to facilitate the folding of the mitten, pleats 9, consisting of perforations, can be installed in the layers 1 and/or 6.

It is clear that the mitten can be produced in different forms, for example, with an angular design as indicated by means of line 10 in FIG. 6.

It is likewise clear that the absorbent element according to the invention offers a great number of application possibilities, for example, as a tarpaulin for the protection of apparatus and similar equipment, or in pieces of clothing, etc. Of course, in such cases use is made of an impermeable protective layer.

The present invention is in no way restricted to the embodiments described as examples and shown in the drawings, but such absorbent element may be developed in different variants without departing from the scope of the present invention.

I claim:

1. An absorbent element for absorbing liquids comprising:
   (a) a first absorbent layer made of a strongly hydrophobic liquid-absorbing material for making direct contact with a liquid having aqueous components and non-aqueous components, said first absorbent layer having the characteristic of being able to absorb a maximum amount of said non-aqueous components whilst absorbing a minimum amount of said aqueous components; and
   (b) a protective layer backing said first absorbent layer and made of a barrier material which is able to substantially completely prevent passage of the absorbed liquid therethrough.

2. An absorbent element according to claim 1, wherein said first absorbent layer is made of a non-woven polyolefin-based material.

3. An absorbent element according to claim 1, wherein said first absorbent layer is made of polypropylene fiber.

4. An absorbent element according to claim 1, wherein said protective layer is made of plastic.

5. An absorbent element according to claim 1, wherein said protective layer is made of plastic foil.

6. An absorbent element according to claim 1, wherein said first absorbent layer consists essentially of a non-woven polyolefin based material.

7. An absorbent element according to claim 1, wherein said protective layer is produced in the form of a reversible envelope capable of being reversed to sealably encase said element.

8. An absorbent element according to claim 1, wherein said first absorbent layer is provided with pleats.

9. An absorbent element for absorbing liquids comprising:
   (a) a first absorbent layer made of a strongly hydrophobic liquid-absorbing material for making direct contact with a liquid having aqueous components and non-aqueous components, said first absorbent layer having the characteristic of being able to absorb a maximum amount of non-aqueous components whilst absorbing a minimum amount of aqueous components;

(b) a protective layer backing said first absorbent layer and made of a barrier material which is able to substantially completely prevent passage of the absorbed liquid therethrough; and (c) a second absorbent layer of liquid-absorbing and retaining active carbon, said second absorbent layer being interposed between said first layer and said protective layer.

10. An absorbent element according to claim 9, wherein said second absorbent layer comprises carbon granules surrounded by a porous polyester pellicle.

11. An absorbent element according to claim 9, wherein said second absorbent layer is made of activated carbon felt.

12. An absorbent element according to claim 9, wherein said layers are supported on a fabric mitten.

13. An absorbent element according to claim 9, wherein said second absorbing layer consists essentially of pure charcoal.

14. An absorbent element for absorbing liquids comprising:

(a) a first absorbent layer made of a strongly hydrophobic liquid-absorbing material for making direct contact with a liquid having aqueous components and non-aqueous components, said first absorbent layer having the characteristic of being able to absorb a maximum amount of non-aqueous components whilst absorbing a minimum amount of aqueous components; and (b) a protective layer backing said first absorbent layer and made of a barrier material which is able to substantially completely prevent passage of the absorbed liquid therethrough, wherein said protective layer is made of butyl rubber.

15. An absorbent element for absorbing liquids comprising:

(a) a first absorbent layer made of a strongly hydrophobic liquid-absorbing material for making direct contact with a liquid having aqueous components and non-aqueous components, said first absorbent layer having the characteristic of being able to absorb a maximum amount of non-aqueous components whilst absorbing a minimum amount of aqueous components; and (b) a protective layer backing said first absorbent layer and made of a barrier material which is able to substantially completely prevent passage of the absorbed liquid therethrough, wherein said protective layer is made of a plastic foil comprising a laminate which comprises at least three layers, the middle layer being made of polyvinylidenechloride and being responsible for the barrier properties thereof.

16. A method of absorbing liquids comprising the steps of:

(a) directly contacting a first side of a an element with a liquid having aqueous components and non-aqueous components, said first side of said element comprising a first absorbent layer made of a strongly hydrophobic liquid-absorbent material;

(b) absorbing a maximum amount of said non-aqueous components whilst absorbing a minimum amount of said aqueous components; and (c) substantially completely preventing passage of the absorbed non-aqueous components through a second side of said element by contacting the absorbed non-aqueous liquid with a second layer which comprises a barrier material separating said first absorbent layer from said second side of said element.

* * * * *